United States Patent
McGuffin

(10) Patent No.: US 8,200,213 B2
(45) Date of Patent: *Jun. 12, 2012

(54) METHOD FOR MAINTAINING DATALINK NETWORK THROUGHPUT BY DELAYING LOWER PRIORITY MESSAGES

(75) Inventor: Thomas F. McGuffin, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/269,114

(22) Filed: Oct. 7, 2011

(65) Prior Publication Data

US 2012/0026872 A1 Feb. 2, 2012

Related U.S. Application Data

(63) Continuation of application No. 11/933,591, filed on Nov. 1, 2007, now Pat. No. 8,045,977.

(51) Int. Cl.
*H04W 4/00* (2009.01)

(52) U.S. Cl. .............. 455/431; 455/452.2; 455/453; 455/445; 370/316; 370/395.2

(58) Field of Classification Search ............ 455/404.1, 455/430, 431, 445, 450–453; 370/316, 395.2–395.54
See application file for complete search history.

(56) References Cited

U.S. PATENT DOCUMENTS

| | | | |
|---|---|---|---|
| 6,147,980 A | 11/2000 | Yee | |
| 7,480,510 B1 * | 1/2009 | Woleben et al. | 455/453 |
| 2005/0181787 A1 | 8/2005 | Judd et al. | |
| 2006/0046715 A1 * | 3/2006 | Burgemeister | 455/431 |
| 2007/0140152 A1 | 6/2007 | Allen et al. | |
| 2008/0101284 A1 * | 5/2008 | Buchwald et al. | 370/329 |

FOREIGN PATENT DOCUMENTS

JP 2001266298 9/2001

* cited by examiner

*Primary Examiner* — Nick Corsaro
*Assistant Examiner* — Chuong A Ngo
(74) *Attorney, Agent, or Firm* — Fogg & Powers LLC

(57) ABSTRACT

A method of maintaining datalink network throughput in a communications channel by delaying lower priority messages is provided. The method comprises receiving periodic channel occupancy data from a radio, and updating channel occupancy status from the channel occupancy data. A determination is then made whether the channel occupancy has reached a first predetermined occupancy threshold. If the first predetermined occupancy threshold has been reached, high priority messages are transmitted, and medium and low priority messages are stored. If the first predetermined occupancy threshold has not been reached, a determination is made whether the channel occupancy has reached a second predetermined occupancy threshold that is less than the first predetermined occupancy threshold. If the second predetermined occupancy threshold has been reached, high and medium priority messages are transmitted, and low priority messages are stored. If the second predetermined occupancy threshold has not been reached, messages of all priorities are transmitted.

20 Claims, 2 Drawing Sheets

METHOD FOR MAINTAINING DATALINK NETWORK THROUGHPUT BY DELAYING LOWER PRIORITY MESSAGES

RELATED APPLICATION

The present application is a continuation application of U.S. application Ser. No. 11/933,591, filed on Nov. 1, 2007, the disclosure of which is incorporated herein by reference.

BACKGROUND

Air traffic control (ATC) centers are used at most airports to coordinate take-offs, landings, and general aircraft traffic around the airport. Traditionally, a pilot uses a radio to speak to an ATC center to request permission or to receive instructions therefrom. With increasing air traffic it has become difficult for ATC centers to process all of the oral communications from aircraft. Consequently, datalink applications have been developed to provide textual communication between pilots and air traffic controllers.

An exemplary datalink application is the Aircraft Communications, Addressing, and Reporting System (ACARS), which is a two-way data communications system used for transmission of text messages between aircraft and ground stations via radio or satellite. A complete datalink communication, which may be generated either manually or automatically, is referred to as a datalink message. Messages from the aircraft to the ground are referred to as downlink messages and messages from the ground to the aircraft are referred to as uplink messages. Services available via datalink include flight plans, weather reports and forecasts, air traffic services, and two-way messaging.

Another datalink application is the Controller Pilot Data Link Communication (CPDLC), which provides for the direct exchange of text messages between an air traffic controller and a pilot. The CPDLC system enables the pilot to communicate electronically with an ATC center by guiding the pilot through a series of screen configurations or displays that either elicit flight information from the pilot or notify the pilot regarding flight information. The CPDLC system is used to send information between aircraft and air traffic control more safely and efficiently.

The time it takes for a datalink message to transit a network varies with the load (i.e, message volume) on the network. Some applications such as CPDLC require a specific level of performance. If the CPDLC messages are delayed too long (e.g., 30 seconds), the messages become stale. Other high priority messages, such as air traffic control messages and wind shear warnings, may also be very time critical. If such messages are delayed because of high network traffic, serious safety issues can be raised resulting in potentially dangerous situations for an aircraft.

SUMMARY

The present invention relates to a method of maintaining datalink network throughput in a communications channel. The method comprises receiving periodic channel occupancy data from a radio, and updating channel occupancy status from the channel occupancy data. A determination is then made whether the channel occupancy has reached a first predetermined occupancy threshold. If the first predetermined occupancy threshold has been reached, high priority messages are transmitted, and medium and low priority messages are stored. If the first predetermined occupancy threshold has not been reached, a determination is made whether the channel occupancy has reached a second predetermined occupancy threshold that is less than the first predetermined occupancy threshold. If the second predetermined occupancy threshold has been reached, high and medium priority messages are transmitted, and low priority messages are stored. If the second predetermined occupancy threshold has not been reached, messages of all priorities are transmitted.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method for maintaining datalink network throughput in a communications channel by delaying lower priority messages. In general, the present method considers current network performance to determine whether to send a particular message immediately or store the message for later transmission when the network is less busy. The method provides a priority scheme that sets up queues and priorities for messaging in order to timely transmit high priority messages in air-to-ground or ground-to-air communications. The method can be implemented as part of an avionics software module and as part of a ground station software module, which operate in an aviation datalink network.

The software is used to monitor the channel occupancy and round trip message time data in the datalink network. For example, the avionics software can measure the round trip message time and percentage of time a communication channel is occupied in the datalink network. When network congestion has caused the round trip message time and the channel occupancy to raise to a predetermined threshold, low priority messages are stored for later transmission. If the network performance continues to decrease such that network congestion causes the round trip message time and the channel occupancy to rise to a higher predetermined threshold, low and medium priority messages are stored. Likewise, the ground station software can perform similar functions. In this manner, the finite bandwidth of the communication channel is reserved for high priority messages, which are then less likely to be delayed. When the network performance improves, the stored messages can then be automatically transmitted.

Exemplary high priority messages in an aviation datalink network include air traffic control messages, and wind shear warnings. Exemplary medium priority messages include requests for weather reports, and requests for a flight plan modification. Exemplary low priority messages include routine aircraft engine data, and maintenance reports.

In addition to the local software functions in the avionics and ground station, a network management function can be implemented. The network management function sends control messages to all of the subsystems in the network to control the flow of messages based on priority.

Figure 1:
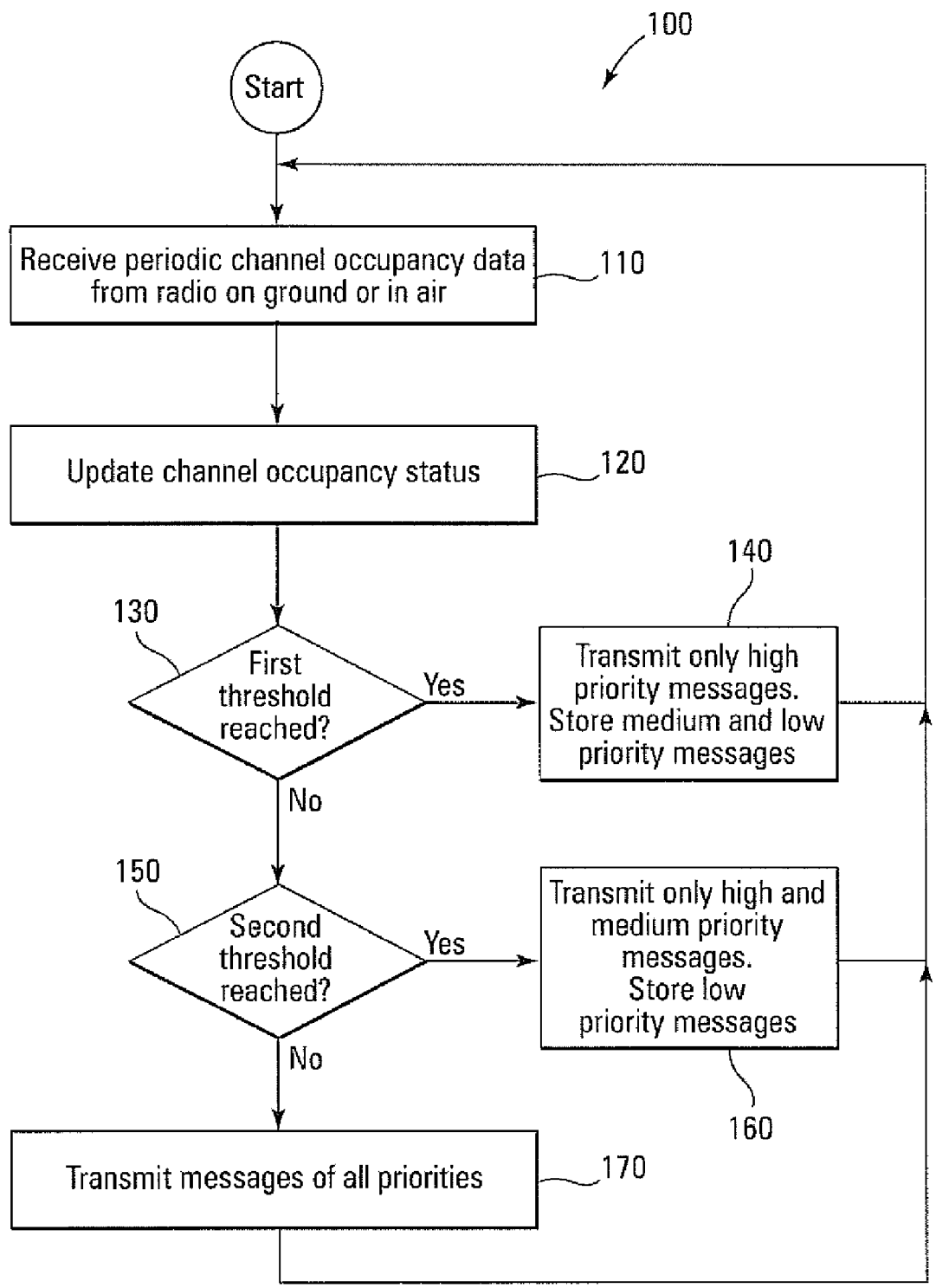
FIG. 1 is a flow diagram representing a method of maintaining datalink network throughput in a communications channel.

FIG. 1 is a flow diagram representing a method 100 for maintaining datalink network throughput in a communications channel by delaying lower priority messages. The method 100 starts when periodic channel occupancy data is received from a radio on the ground or in the air (block 110) while the channel occupancy status is being monitored. For example, a standard avionic VHF radio provides channel occupancy data every second. The channel occupancy status is then updated (block 120), such as by monitoring round trip message time data in the network. The channel occupancy data from the radio can be processed in order to better reveal the data trend. For example, the channel occupancy data can be filtered, smoothed, or averaged using conventional signal processing techniques.

A determination is then made whether the channel occupancy has reached a first predetermined occupancy threshold (block 130). For example, the first predetermined occupancy threshold can be set at 45% or greater occupancy, or at some other threshold as desired. A network operator can adjust the threshold as needed to optimize network performance. If the first predetermined occupancy threshold has been reached, only high priority messages are tranmitted, and medium and low priority messages are stored in memory for later transmittal (block 140). The method 100 then continues to monitor the channel occupancy status. If the first predetermined occupancy threshold has not been reached, a determination is then made whether the channel occupancy has reached a second predetermined occupancy threshold that is less than the first threshold (block 150). For example, the second predetermined occupancy threshold can be set at 40% or greater occupancy, or at some other threshold as desired that is less than the first predetermined occupancy threshold. If the second predetermined occupancy threshold has been reached, only high and medium priority messages are tranmitted, and low priority messages are stored for later transmittal (block 160). The method 100 then continues to monitor the channel occupancy status. If the second predetermined occupancy threshold has not been reached, messages of all priorities are transmitted (block 170), and the method 100 continues to monitor the channel occupancy status.

When the network performance improves and drops below the first predetermined occupancy threshold, the stored medium priority messages are transmitted at a reasonable rate in order to attempt to prevent congestion from reoccurring. When the network performance improves further and drops below the second predetermined occupancy threshold, the stored low priority messages are transmitted at a reasonable rate in order to attempt to prevent congestion from reoccurring.

Figure 2:
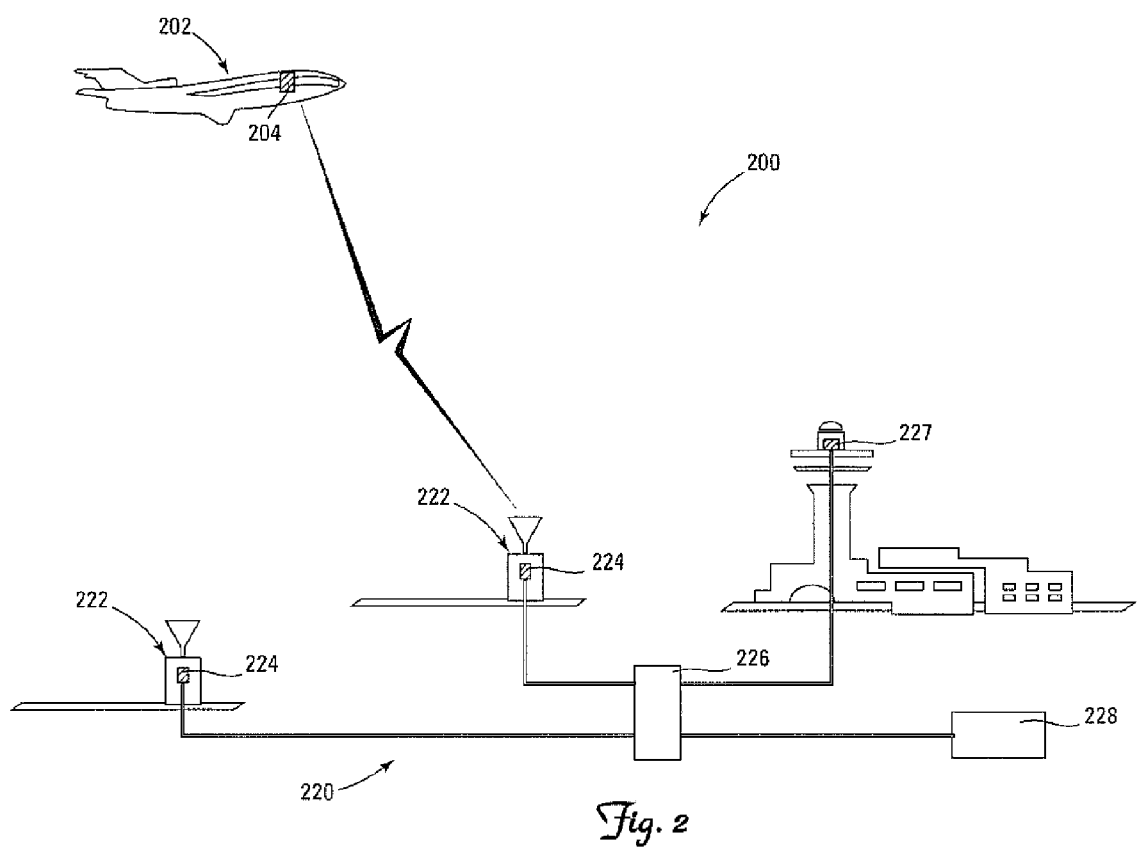
FIG. 2 is a schematic diagram depicting an avionics and ground network system that can implement a method of maintaining datalink network throughput in a communications channel.

The method 100 can be implemented in both avionics software for an aircraft and in ground station software for an air traffic control workstation. For example, FIG. 2 is a schematic diagram depicting an avionics and ground network system 200 that can implement the method 100. An aircraft 202 contains at least one aircraft computer 204, such as a communication management unit, or a communication management function imbedded in general purpose avionics computer. The aircraft computer 204 includes a readable medium having instructions stored thereon for a method of maintaining datalink network throughput in a communications channel, such as method 100 described previously. The instructions stored on the readable medium of aircraft computer 204 can be part of an avionics software module for aircraft 202.

A ground network 220 has at least one ground station 222, containing a ground station computer 224, in operative communication with aircraft computer 204. The ground network 220 also has a router 226 that directs downlink messages from ground station computer 224 to ground computers attached to ground network 220, such as an air traffic control computer 227 or an airline computer 228. The router 226 manages the network such that it is possible to deliver uplink messages from the ground computers attached to ground network 220 via ground station computer 224 to aircraft computer 204. The ground station computer 224 and/or router 226 include a readable medium also having instructions stored thereon for a method of maintaining datalink network throughput in a communications channel, such as method 100. The instructions stored on the readable medium of ground station computer 224 and/or router 226 can be part of a software module for network management in ground network 220.

In a method for operating avionics and ground network system 200, which maintains datalink network throughput in a communications channel, one or more messages having a first priority (high priority) are generated by aircraft 202 or ground computers such as air traffic control computer 227 or airline computer 228. Additionally, one or more messages having a second priority (medium priority) that is lower than the first priority is generated, and one or more messages having a third priority (low priority) that is lower than the second priority is generated. The aircraft computer 204 receives periodic network channel occupancy data from a radio in the aircraft when the aircraft is airborne and on the ground. The ground network 220, ground station computer 224, and/or router 226 receive periodic network channel occupancy data from a radio in the ground station 222.

A channel occupancy status is updated from the channel occupancy data, and a determination is made whether the channel occupancy has reached a first predetermined occupancy threshold (e.g., 45% or greater). If the first predetermined occupancy threshold has been reached, messages having the first priority are transmitted, and messages having the second priority and the third priority are stored at aircraft computer 204, ground station computer 224, or router 226 for later transmittal. An alert indication can be provided to the pilot or air traffic controller when messages are being stored. If the first predetermined occupancy threshold has not been reached, a determination is made whether the channel occupancy has reached a second predetermined occupancy threshold (e.g., 40% or greater) that is less than the first predetermined occupancy threshold. If the second predetermined occupancy threshold has been reached, messages having the first priority and the second priority are transmitted, and messages having the third priority are stored for later transmittal. If the second predetermined occupancy threshold has not been reached, messages of all priorities are transmitted.

The present method can be implemented as part of the datalink software in a communication management function (CMF), such as the EPIC® CMF (available from Honeywell), of a communication management unit (CMU), or in any other avionics communication computer in an aircraft. The present method can also be implemented in a flight deck communications function (FDCF); in datalink avionics equipment from original equipment manufacturers (OEMs); and in buyer furnished equipment (BFE) datalink avionics equipment for airlines. Additionally, the present method can be implemented in ground datalink systems operated by service providers such as ARINC and SITA, and can provide the communication protocols to the datalink software in an air traffic control (ATC) computer.

The present method can be used in fixed applications which include fixed message sets driven by industry standards, and in variable applications. Examples of fixed applications include the Aircraft Communications, Addressing, and Reporting System (ACARS); Future Air Navigation Systems (FANS), such as Controller Pilot Data Link Communications (CPDLC) which is used to supply controller/aircrew exchange services; Flight Information Service (FIS); Air Traffic Services (ATS) Facilities Notification (AFN), which is the FANS application used for Data Link Initiation Capability (DLIC), with DLIC being a datalink function used to associate technical addresses for datalink with a flight plan in the ground system; and Automatic Dependent Surveillance (ADS). Other exemplary fixed applications with fixed message sets driven by industry standards include those in the Aeronautical Telecommunications Network (ATN), and Context Management (CM), which is the ATN application used for DLIC. Examples of variable message sets that are user defined include Airline Operational Communications (AOC), and Aeronautical Administration Communication (AAC).

Instructions for carrying out the various process tasks, calculations, and generation of signals and other data used in the operation of the method of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs), or field programmable gate arrays (FPGAs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, and the like, which perform particular tasks or implement particular abstract data types. These represent examples of means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system comprising:
   means for receiving periodic channel occupancy data from a radio;
   means for updating channel occupancy status from the channel occupancy data;
   means for determining whether the channel occupancy has reached a first predetermined occupancy threshold;
   means for transmitting high priority messages, and storing medium and low priority messages, when the first predetermined occupancy threshold has been reached;
   means for determining whether the channel occupancy has reached a second predetermined occupancy threshold that is less than the first predetermined occupancy threshold when the first predetermined occupancy threshold has not been reached;
   means for transmitting high and medium priority messages, and storing low priority messages, when the second predetermined occupancy threshold has been reached; and
   means for transmitting messages of all priorities when the second predetermined occupancy threshold has not been reached.

2. The system of claim 1, wherein the system is implemented in an aircraft communications, addressing, and reporting system (ACARS).

3. The system of claim 1, wherein the system is implemented in future air navigation systems (FANS).

4. The system of claim 1, wherein the system is implemented in a controller pilot data link communication (CPDLC) system.

5. The system of claim 1, wherein the system is implemented in a data link initiation capability system.

6. The system of claim 1, wherein the system is implemented in a flight information service system.

7. The system of claim 1, wherein the system is implemented in an air traffic services facilities notification system.

8. The system of claim 1, wherein the system is implemented in an aeronautical telecommunication network (ATN).

9. The system of claim 1, wherein the system is implemented in a context management system.

10. The system of claim 1, wherein the system is implemented in an automatic dependent surveillance system.

11. The system of claim 1, wherein the system is implemented in an airline operational communications system, or an aeronautical administration communication system.

12. The system of claim 1, wherein the system is implemented in a communication management function of a communication management unit 13. The system of claim 1, wherein the system is implemented in a flight deck communications function.

14. The system of claim 1, wherein the system is implemented in an air traffic control computer.

15. A method comprising:
   receiving periodic channel occupancy data from a radio;
   updating channel occupancy status from the channel occupancy data;
   determining whether the channel occupancy has reached a first predetermined occupancy threshold;

transmitting high priority messages, and storing medium and low priority messages, when the first predetermined occupancy threshold has been reached;

determining whether the channel occupancy has reached a second predetermined occupancy threshold that is less than the first predetermined occupancy threshold when the first predetermined occupancy threshold has not been reached;

transmitting high and medium priority messages, and storing low priority messages, when the second predetermined occupancy threshold has been reached;

transmitting messages of all priorities when the second predetermined occupancy threshold has not been reached; and wherein the method is implemented as part of communication protocols for an aeronautical telecommunication network (ATN), or a future air navigation systems (FANS) network.

16. The method of claim 15, wherein the method is implemented as part of the communication protocols for a controller pilot data link communication (CPDLC) system.

17. The method of claim 15, wherein the method is implemented as part of the communication protocols for a context management system.

18. The method of claim 15, wherein the method is implemented as part of the communication protocols for an automatic dependent surveillance system.

19. The method of claim 15, wherein the method is implemented as part of the communication protocols for a data link initiation capability system.

20. The method of claim 15, wherein the method is implemented as part of the communication protocols for a flight information service system.

* * * * *